United States Patent [19]
Case

[11] Patent Number: 6,002,493
[45] Date of Patent: Dec. 14, 1999

[54] METHOD FOR REPRODUCING AN IMAGE

[76] Inventor: Robert M. Case, 1 Morrill Pl., Kimberling City, Mo. 65686

[21] Appl. No.: 08/165,795

[22] Filed: Dec. 13, 1993

[51] Int. Cl.$^6$ .................................................... H04N 1/407
[52] U.S. Cl. ............................................ 358/455; 358/457
[58] Field of Search ..................................... 358/455, 456, 358/459, 448, 457, 458; 382/237, 270; H04N 1/40, 1/405, 1/407

[56] References Cited

U.S. PATENT DOCUMENTS

| | | | |
|---|---|---|---|
| 4,004,079 | 1/1977 | Boston | 358/256 |
| 4,194,221 | 3/1980 | Stoffel | 358/456 |
| 4,349,846 | 9/1982 | Sekigawa | 358/280 |
| 4,350,996 | 9/1982 | Rosenfeld | 358/75 |
| 4,668,995 | 5/1987 | Chen et al. | 358/459 |
| 4,730,221 | 3/1988 | Roetling | 358/456 |
| 4,736,254 | 4/1988 | Kotera et al. | 358/283 |
| 4,924,301 | 5/1990 | Surbrook | 358/75 |
| 5,121,223 | 6/1992 | Roe | 358/455 |
| 5,258,850 | 11/1993 | Tai | 358/298 |

OTHER PUBLICATIONS

Proceeding of the S.I.D., vol. 19, No. 3, 1978, Los Angeles, pp. 127–131, R.W. Pryor et al.–"Bilevel Image Displays—A New Approach".

Copy of Search Report in Cooresponding PCT Application.

*Primary Examiner*—Kim Yen Vu

[57] ABSTRACT

The present invention relates to a method for reproducing images from precessionary art. The method comprises the steps of converting a piece of precessionary art to a multi-bit pixel depth bitmap, defining a first multi-pixel cell having particular dimensional attributes from the bitmap, determining a gray level for the first multi-pixel cell, dividing the first multi-pixel cell into two groups of alternating pixels with a first one of the groups being nominally on and a second one of the groups being nominally off, and deriving a first derivation cell depicting a maximum apparent gray from the first multi-pixel cell having the two equal groups of alternating pixels.

11 Claims, 4 Drawing Sheets

| 60 | 62 | 67 | 84 | 82 | 104 | 81 | 85 | 73 | 114 |
|----|----|----|----|----|-----|----|----|----|-----|
| 52 | 65 | 67 | 73 | 134 | 122 | 103 | 142 | 128 | 148 |
| 63 | 69 | 76 | 122 | 162 | 179 | 200 | 196 | 204 | 219 |
| 80 | 72 | 73 | 104 | 120 | 162 | 185 | 192 | 195 | 207 |
| 73 | 68 | 67 | 76 | 71 | 63 | 87 | 103 | 133 | 155 |
| 54 | 52 | 43 | 68 | 77 | 50 | 66 | 48 | 72 | 85 |

B1 (upper-left shaded region), B2 (lower shaded region)

Pattern

Cell Order

METHOD FOR REPRODUCING AN IMAGE

BACKGROUND OF THE INVENTION

The present invention relates to a method for processing an image and more particularly to a method for enabling gray-scale representation by single-bit pixel-depth bitmaps to more closely approach gray-scale representation by traditional photographic methods.

The state-of-the-art of gray-scale representation by single-bit pixel-depth bitmaps is tied to traditional photographic halftone methods. In the halftone printing of continuous tone black and white images, paper or other reflective hardcopy material is imprinted with a large number of circles or dots of black ink with the area of each dot being proportional to the blackness of a corresponding incremental area of the original photograph or image. Each halftone dot appears at a position that is equidistant from each adjacent potential halftone dot position so that each halftone dot occupies a single resolution cell or element within a rectangular array or grid. Traditionally, the printing plates for halftone printing were prepared by photographing the image to be reproduced through a screen having the desired interstitial spacing or cell size. The process, known as screening, results in a photographic negative known as a halftone screen which can be utilized to produce printing plates with the halftone screen exhibiting the desired dot size-image intensity relationship and regularity of spacing between dots.

When an image that has been printed by halftoning is viewed from a distance, the eye performs spatial integration so that various regions of the image are perceived as being black, white, or as being of intermediate intensity, i.e. a shade of gray. The degree to which halftone printing is perceived as being identical to the original black and white image largely depends upon the halftone dot frequency that is employed, which is commonly referred to as the line frequency or screen ruling.

Another important factor is the ability of the printing press or printer to imprint the type of paper or other hardcopy material being employed with halftone dots that correspond in area with the dots of the halftone screen. For example, because of the type of paper employed and the printing presses used, newspaper halftones typically are printed at a line frequency of 60 to 100 lines per inch, while magazine and book halftones typically are printed at a line frequency on the order of 133–150 lines per inch.

Digital halftoning emulates the photographic halftoning process. However, because the digital halftone dot is built up of fixed size picture elements or pixels, centered contiguous placement results in location errors that may reduce the quality of reproduction relative to the precessionary art.

Numerous techniques for improving halftoning processes have been described in the patent literature. U.S. Pat. Nos. 4,633,327 to Roetling; 4,924,301 to Surbrook; 4,942,480 to Shu; 4,945,422 to Ng; 5,196,942 to Shiau; 5,027,078 to Fan; 5,107,346 to Bowers et al; and 5,130,821 to Ng illustrate some of these techniques.

The Roetling patent relates to enhancement halftoning. The method described therein appears to begin with a cell using centered contiguous pixel clusters based on the traditional halftone screen. It uses a system of macro and micro sampling to increase or decrease the black-to-white ratio (contrast) to alter the patterns. This process however fails to address the problem of pixel location errors which occur in conventional digital halftoning processes.

The Surbrook patent relates to an apparatus and method for producing halftone screens from continuous tone intensity signals that are supplied from an optical scanner. A digital signal processor processes the continuous tone intensity values to establish memory maps which, in conjunction with a digital data output device, produce the desired halftone screens. The main problem with the approach employed by Surbrook is a clinging to the traditional photographic halftones centered contiguous pixel clusters. It alters the pattern's dot growth by changing where the next dot falls by analyzing desired screen angles. Because of its dependency on contiguous dot clusters, all meaningful pattern change actually takes place in a very large grid, opening this process to a reduced but still substantial probability of moires and banding.

The Shu patent relates to a technique for reproducing a halftone original with moire reduction and tone adjustment. The technique described therein begins with a traditional photographic halftone and converts it to a digital halftone by assuming a super cell some 7 to 12 times larger and using its macro gray level to determine dot placement alterations. This is coupled with an alternative threshholding method.

The '422 patent to Ng deals with the false density contour of a digital halftone cell—simply the misplacement of the next dot. This placement error is suppressed by means of "weighted probability" using computer-generated random selection. The problem with this approach is that it won't necessarily track with the precessionary art.

The Fan patent relates to a method of unscreening a digitally created halftone image to reconstruct a continuous tone image. This method simply replaces the error-prone digital halftone dot placement with a new dither pattern. The method comprises the steps of determining the parameters of the halftone screen used to generate the halftone image, logically filtering the halftone image to determine approximate continuous tone levels, and optionally, smoothing the continuous tone levels of the reconstructed image to minimize the quantization errors introduced during the original screening or dithering process.

The Bowers patent relates to a process for providing digital halftone images with random error diffusion. This process uses an advanced error diffusion model which assumes that misplacement of dots is derived from the threshold rounding. It includes the diffusion of such thresholding "errors" by spreading them to adjacent pixels and the introduction of computer-generated randomness to hide the problem. This is overcomplicated arbitrary dot placement without reference to the precessionary art.

The '821 patent to Ng relates to a method and apparatus for digital halftoning employing density distribution for selection of a threshold template. The Ng's method recognizes that centered contiguous pixel clusters yield location errors and that placement does not have to be contiguous. But, by altering patterns through referencing adjacent halftone cells instead of the precessionary art, the benefit of increased permutations is countered by potentially equally inaccurate locations, recalling elements of digital posterization at a sacrifice of gray levels.

The Shiau patent relates to a system and method for determining picture element values. The method cuts the cell in half to 2×4 and places them at 45 degree angles to each other. While the number of possible gray levels is reduced to 8 plus white, the method purports to use but 5. The dot growth pattern is an arbitrary one and has to rely on error diffusion for even a semblance of proper placement.

One method which has been proposed for producing halftone images is the dither method. U.S. Pat. Nos. 4,651,293 to Kato; 4,736,254 to Kotera et al.; 4,800,443 to Crinon et al.; 4,866,534 to Tada; and 5,053,887 to Thompson illustrate methods for producing images which can be termed "dither" methods.

The Kato patent relates to an image processing system which processes an input image such as a halftone image having a high periodicity (adjacent patterns are the same) into a two-level image by use of dither matrices. Peaks of an auto-correlation of the image are calculated and, then, a mean period of the calculated peaks. An adequate dither matrix is selected in response to the calculated mean period. The problem with computational generation of patterns is that there are so many (more than 20 trillion for a 4×4 cell).

The Kotera et al. patent relates to a method and apparatus for generating pseudo-halftone dots by comparing gray scale values of an original with dither threshold values stored in cells of a matrix array divided into imaginary matrices of elemental areas each containing one cell. This patent takes the position that if one dither pattern doesn't achieve the desired results, combining elements of three would be better. It chooses between the three pattern generators (Bayer, mesh and spiral) for each cell. This yields a large number of permutations and is quite computational.

The Crinon patent relates to a method and apparatus for carrying out a dithering operation. While this method uses the precessionary art to determine pixel location, its preferred grid is 16×16 which would yield an enormous number of pattern permutations. As a result, a great computational effort has to be undertaken.

The Tada patent relates to an image processing apparatus for transforming eclectic data of a halftone image into a bi-level image by using a dither matrix. The apparatus has a plurality of dither matrices of different patterns to each other. The dither matrices are chosen to remove textures due to dither processing. The method employed by Tada begins with a bit-mapped halftone image which is believed to mean cell-centered contiguous pixel clusters. This pattern is replaced by new dither patterns generated from the halftone pattern and not the precessionary art. The method seeks to avoid any checkered gray pattern.

The Thompson patent relates to a technique for producing a fine grained dithered halftone image having an increased number of gray levels. This technique increases a 4×4 cell by one additional pixel (placed just above the upper lefthand pixel). This new polygon cell is interleaved with similar adjoining cells to avoid duplicating adjacent patterns to reduce moires and banding. This is coupled with an alternative thresholding model. All in all, this technique is very computationally-intensive.

Still other techniques for processing images are shown in U.S. Pat. Nos. 4,741,046 to Matsunawa et al.; 4,752,822 to Kawamura; 4,926,248 to Kobayashi et al.; 5,083,210 to Reilly et al.; and 5,200,831 to Tai. The Matsunawa et al. patent relates to a method of discriminating pictures. The method described therein starts with a bitmap and attempts to ameliorate the gray level versus detail trade-off by computational discrimination between inherent patterns halftone, line and continuous-tone. The method appears to select a new pattern depending on this discrimination. It seems highly unlikely that enough information could be extracted from error-prone bitmap to correct it without going back to the precessionary art.

The Kawamura patent relates to a color halftone image processing apparatus. It appears that Kawamura believes that pattern errors are somehow related to the square pixel grid. A new grid of 20 pixels shaped like a plus sign is created so that it will interleave with other similar cells. A new pattern is generated for this polygon assuming that adjacent patterns, because they are not perpendicular, will eliminate macro cell patterns. The pattern generation is arbitrary and unwanted pattern juxtapositions are still probable.

The Kobayashi et al. patent relates to a scanning recording type printing method and apparatus for increasing image quality by controlling the dot locations within image pixels. The method begins with continuous tone precessionary art and creates a pattern that adds one extra contiguous black dot in the scan line for each black dot placed and one extra contiguous white dot in the scan line for each white dot placed. If accurately derived from the precessionary art, this approach could generate a pattern suitably diverse to avoid moires and banding, but at a cost of doubling the matrix size and the resultant location errors.

The Reilly et al. patent relates to a technique for eliminating the contouring on displayed gray level images. The method described therein acknowledges digital halftoning dither pixel misplacements, but instead of correctly placing then using the precessionary art, it uses "pseudo random noise" in the form of additional black pixels to "hide" such location errors.

The Tai patent relates to a method and arrangement for locally switching gray dot types to reproduce an image with gray level printing. The method described in this patent recognizes that a unified model is needed to render both detail and gray for different renderings type or line drawings and grayscale. It also recognizes that contiguous clusters (threshold dots) are better for the former and non-contiguous patterns (mixed dots) are better for the latter. The process primarily distinguishes between the two and chooses one pattern or the other. The patterns are arbitrary since 3 bits or 4 bits are used to described them.

SUMMARY OF THE PRESENT INVENTION

It is an object of the present invention to provide an improved method for reproducing images from precessionary art.

It is yet another object of the present invention to provide a method for reproducing images which provides a more accurate gray-scale representation for any stated pixel size.

It is still another object of the present invention to provide a method as above which reduces moires and banding.

Still other objects and advantages will become more apparent from the following description and the accompanying drawings.

The foregoing objects are attained by the inventive method of the present invention which broadly comprises the steps of: converting a piece of precessionary art into a multi-bit pixel-depth bitmap; defining a first multi-pixel cell having particular dimensional attributes; determining the gray level of the first multi-pixel cell; dividing the first multi-pixel cell into two equal groups of alternating pixels; and deriving a first derivation cell depicting maximum apparent gray from the first multi-pixel cell with the two equal groups of alternating pixels. The foregoing method is repeated until a series of derivation cells equal in number to the number of multi-pixel cells in the multi-bit pixel-depth bitmap are derived. The derivation cells are arranged in the same locations as the multi-pixel cells from which they came and are converted into a visible reproduction of the original precessionary art. The method of the present invention is preferably implemented with the aid of a computer.

The details of the method of the present invention are set out in the following description and drawings wherein like reference characters depict like elements.

DETAILED DESCRIPTION

Figure 1:
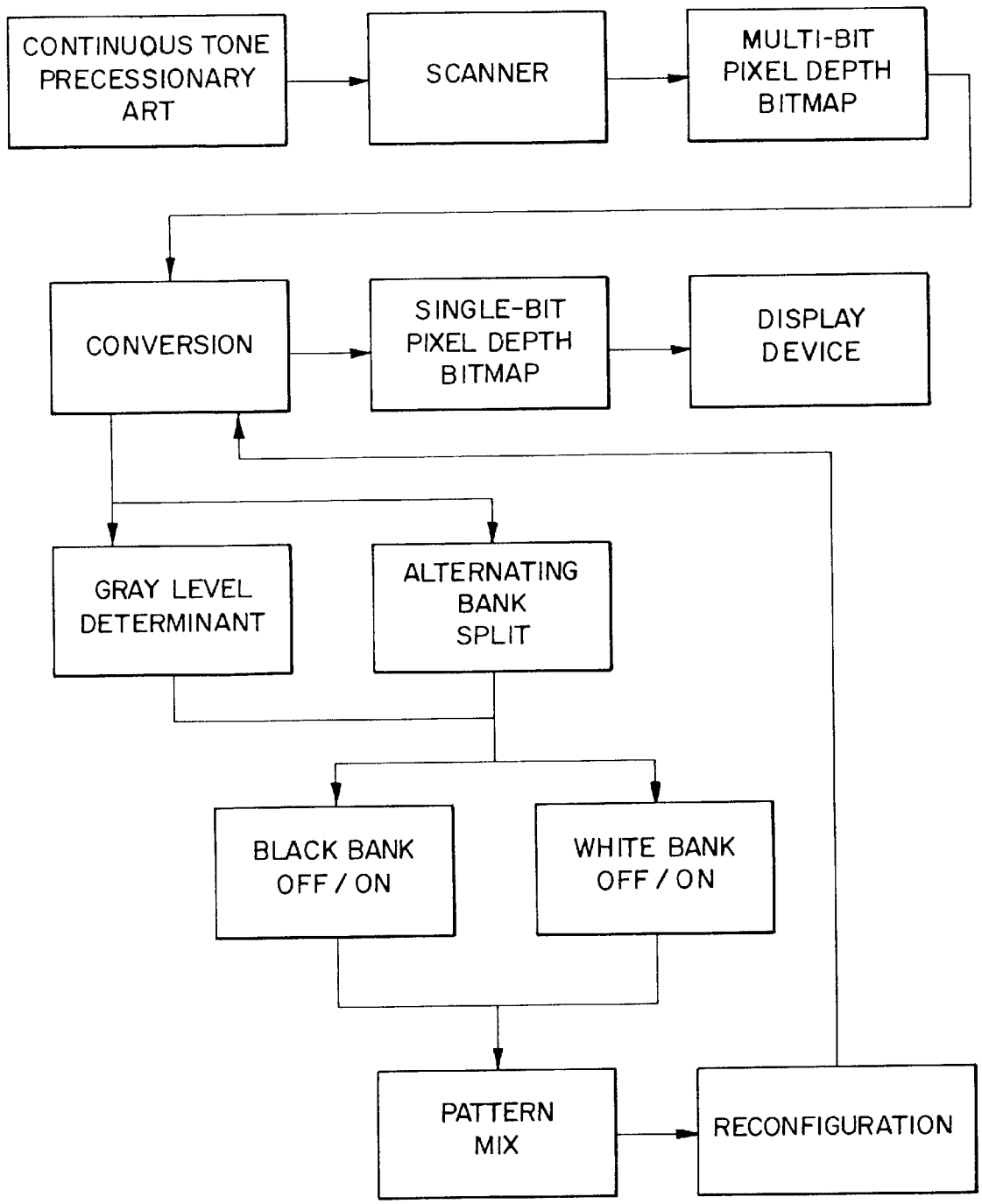
FIG. 1 is a flowchart illustrating the method of the present invention.
Figures 2, 3:
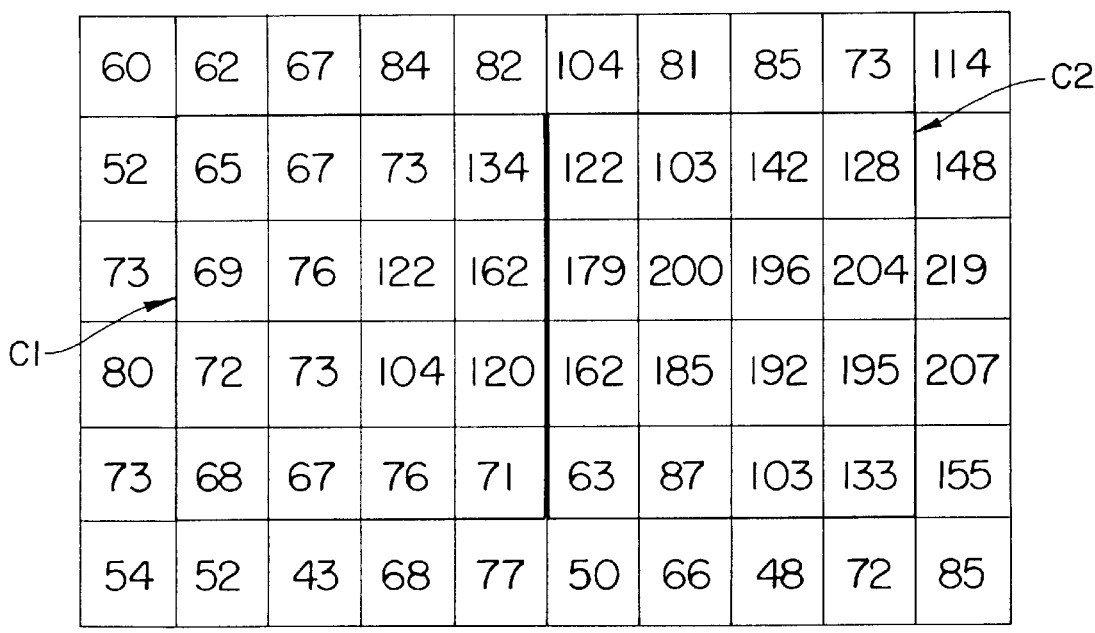
FIG. 2 is a depiction of a multi-bit pixel-depth bitmap.
FIG. 3 illustrates a multi-pixel cell formed from the bitmap of FIG. 2.

Referring now to the drawings, FIG. 1 is a flowchart illustrating the various steps of the present invention. As shown therein, the first phase of the method of the present invention is to convert the precessionary art such as a continuous-tone photograph to a multi-bit pixel-depth bitmap, a portion of which is shown in FIG. 2. This may be done using a digital scanner with photosensitive cells to detect degrees of light reflected from the scanned material and to determine gray level. Such a scanner can read the precessionary art's pixels to a gray depth of 1, 2, 4, 8, 16, 24, 32 and even 48 bits. For each area of the precessionary art equal in size to a single-bit pixel-depth bitmap pixel, the gray level is determined. As used herein the term "single-bit pixel-depth bitmap" refers to a bitmap which uses the binary 2 to the first power or 2 levels of gray (on or off, black or white) for each pixel. The term "multi-bit pixel-depth bitmap" refers to a bitmap which uses a larger binary such as $2^2$, $2^3$, $2^4$, etc.

After the gray level is determined, the attributes of a multi-pixel cell to be analyzed are chosen as part of a conversion step. It should be recognized that within the multi-bit pixel-depth bitmap representing the converted precessionary art, there are a number of such multi-pixel cells to be analyzed. The analysis of each cell is done by choosing a square multi-pixel cell C1 and C2, such as those shown in FIG. 3, from within the multi-bit pixel-depth bitmap. The cells C1 and C2 each preferably have sides with a length of N pixels where N is a number divisible by two. It is preferred that the number N be divided by 2 because two pixels horizontally and two pixels vertically are the minimum number necessary to enable a checkerboard type method of organizing the pixels. Thus, the cells C1 and C2 shown in FIG. 3 each have a size of 4×4 pixels. The cells C1 and C2 are also characterized by the fact that the possible levels L of apparent gray are defined by the equation:

$$L=N^2+1. \quad (1)$$

Following the definition of the dimensional attributes of the cell, the gray levels of the cells C1 and C2 are determined. This may be done using one of the known methods for multi-bit and single-bit gray level determination to compare the actual and total possible gray levels of the multi-bit pixel depth primary cell C and to determine which of the $N^2+1$ gray levels, a desired single-bit pixel-depth destination cell is to depict. The particular method employed is not significant to the overall method of the present invention. What is significant is that the gray levels of the cells C1 and C2 are determined. After the gray levels are determined, a value V is assigned to the gray level to be depicted by the single-bit multi-pixel cell. The value V may range from 0 to $N^2$. The value V has this range because the total number of gray levels able to be depicted by a single-bit multi-pixel cell is one for each of the pixels filled in black plus all pixels unfilled or white. Thus, a 4×4 pixel cell can contain 16 each black pixels ($N^2$) or none. Thus, each specific cell will have a range of levels from 0 (all white) to $N^2$ (all black).

For the cells in FIG. 3, the gray level of each cell is determined in the following manner. The number of possible gray levels is first determined. In this case, there are 255 (the number of different grays for any one pixel)×16 pixels or 4080 possible gray levels. Thereafter, the gray level values in each of the pixels forming the cell C1 are added. Thus, in cell C1, the sum of the gray level values for the 16 pixels is 1419 (65+67+73+134+69+76+122+162+72+73+104+120+ 68+67+76+71). In the cell C2, the sum of the gray level values for the 16 pixels is 2394 (122+103+142+128+179+ 200+196+204+162+185+192+195+63+87+103+133). The percentage of gray is then determined for each cell C1 and C2 by dividing the sum of the gray levels for that cell by the number of possible gray levels. The percentages thus determined are then converted into an actual number of pixels in the cell to be filled in black and are determinative of the value to be assigned to each cell. Thus for cell C1, a value "V" of 6 is assigned which is equal to 35% gray (1419/4080) or six pixels and for cell C2, a value "V" of 9 is assigned which is equal to 59% gray (2394/4080) or nine pixels.

Figures 4, 5:
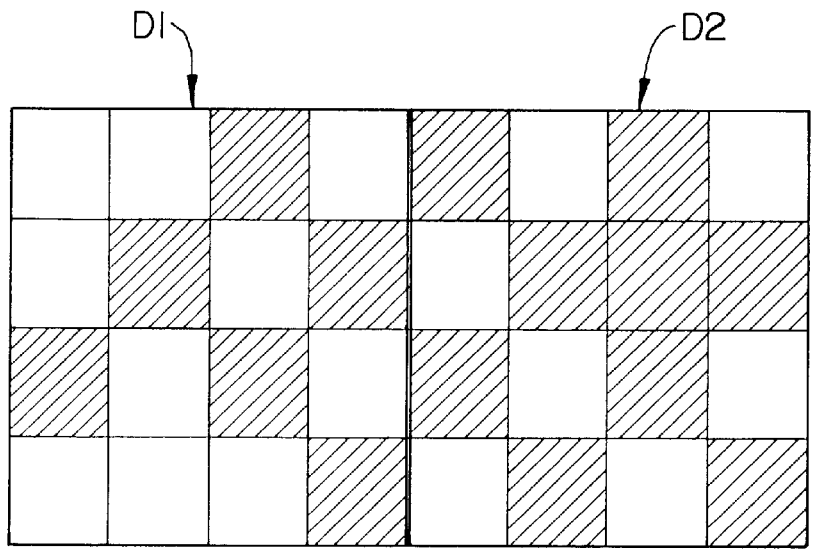
FIG. 4 illustrates the multi-pixel cell of FIG. 3 with certain pixels turned on and off.
FIG. 5 illustrates a cell derived in accordance with the present invention.

Following the determination of each cell's gray level, the cell is arranged in a checkerboard pattern by dividing it into two equal groups of alternating banks of pixels as shown in FIG. 4. Cell group B1 is a bank of pixels that is nominally ON (the shaded pixels) and cell group B2 is a bank of pixels that is nominally OFF (the unshaded pixels).

This checkerboard pattern is created because the way a single-bit pixel-depth bitmap can depict gray with just black and white is relational and spatial (how much black and where; how much white and where). By using a checkerboard pattern approach and painting with gray as is done here, the relationship aspect can be maintained while the spatial aspect is fine tuned. By dividing the cell into a nominally black group (B1) and a nominally white group (B2), the cell is opened up for more accurate placement of a greater or fewer number of black pixels (spatially making the right "white" pixels black and spatially making the right "black" pixels white). By starting with the two groups (B1 and B2) and knowing the total number of cells to be black, only one bank or the other has to be sorted to know which pixels to turn off or on during a subsequent step.

Finally, the multi-bit pixel-depth bitmap data is reduced to a single-bit pixel-depth bitmap. First, an integer i is derived using the equation:

$$i=V-(N^2/2) \quad (2)$$

where V=the value assigned to the cell: and N=the number of pixels per cell side.

If the integer i is negative, a number of pixels equal to the integer are turned off in order from lowest to highest gray-level. In turning off pixels, random or other selection may be used when choosing between equal values. If the integer i is positive, a number of pixels equal to the integer are turned on in order from highest to lowest gray level. Again, random or other selection may be used when choosing between equal values.

Thus, for cell C1, the integer i would be $-2(i=6-(4^2/2))$ and for cell C2, the integer i would be $+1$ $(i=9-(4^2/2))$. From this, new cells D1 and D2 are derived. The new cell D1 (as shown in FIG. 5) has turned on all the shaded cells from cell C1 in FIG. 4 with the exception of those cells containing the gray values 65 and 67. The new cell D2 (also as shown in FIG. 5) has turned on all of the shaded cells from cell C2 in FIG. 4 plus one additional cell (the cell having a gray value of 196). The derived cell D shown in FIG. 5 depicts the maximum apparent gray available with the method of the present invention. The process is then repeated for each of the multi-pixel cells to be analyzed so that a series of derived cells equal in number to the multi-pixel cells being analyzed are generated. The size and location of each derived cell D is analogous to the size and location of a similar area in the precessionary art. By keeping each derived cell in the same relative location to each other, a large bitmap can be assembled that stays analogous to the similar large area of the precessionary art. After the bitmap has been assembled, it is converted back to a depiction of the precessionary art in a form which can be viewed by the human eye.

The method of the present invention is preferably implemented with the assistance of a computer (not shown). The computer may comprise any suitable computer known in the art such an Apple Macintosh computer, an IBM computer or the like. The conversion information generated by the scanner (not shown) may be inputted and stored in the computer. Thereafter, the various steps of the method of the present invention to form the derived cells may be performed by the computer via a computer program embodying the method steps outlined above. The computer program may be in any desired language and may easily be generated by one of skill in the programming arts having the information contained herein. If desired, the computer program may be embedded on a microchip installed in a device such as a copying machine.

The final depiction of the precessionary art generated from the derived cells may be viewed on a monitor or other display device attached to the computational computer and/or to a remote computer. Alternatively, it may be printed on a sheet of paper by a suitable printer connected to the computational computer or a remote computer linked to the computational computer.

Figure 6A:
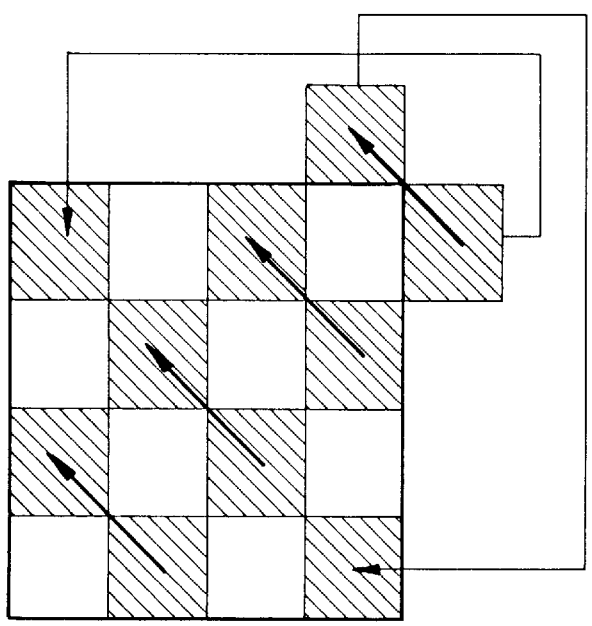
FIGS. 6(a) and 6(b) illustrate a digital cross-hatch pattern which can be used in the method of the present invention.
Figure 6B:
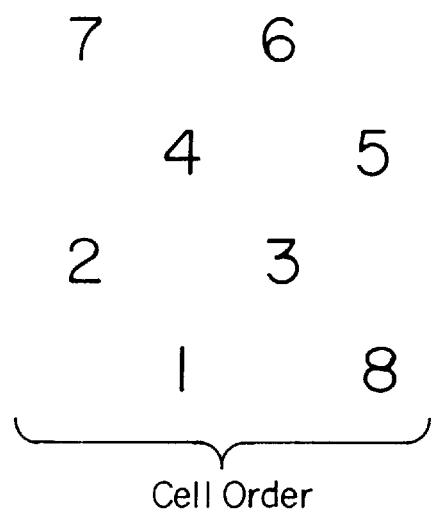

When forming the derived cell D from the cell groups of FIG. 4, there sometimes is an occasion when a pattern should be used. This occurs when there is a large area exactly the same gray level. In the event that a choice to activate (turn on or off) must be made among pixels of equal gray level, a pattern called "digital cross-hatching" can be used. This pattern selects from among either bank of pixels (numbering $N^2/2$) in the following manner. Any of the selected bank's pixels may be the "start pixel" or the first to be activated (if not already). Then, a 45° diagonal row of one or more pixels (numbering N/2 including the "start pixel") is activated (if not already) in order. Next, a parallel row of N/2 pixels is activated (if not already) in order, using a new "start pixel" 45° diagonal and adjacent to the first "start pixel" and at an angle of 90° from the second pixel in the first row. Additional such rows continue until all pixels in the bank are activated (if not already). If the pattern indicates a pixel outside the boundaries of a cell, a "wrap" to the same relative internal cell pixel that would have been activated in the adjoining cell is performed. FIGS. 6(a) and 6(b) illustrate this digital cross-hatching.

The method of the present invention has been found to reduce the possible pixel placement error to a maximum average distance of one pixel. This makes the single-bit pixel depth bitmap more analogous to the precessionary art. An advantage to the method of the present invention is a more accurate gray-scale representation for any stated pixel size, reducing the need for smaller pixel/higher dots-per-inch bitmaps. Another advantage is gentle gray scale change and less perceptible patterns that reduce such undesirable effects as moires and banding. It is the increased accuracy of pixel placement in the present method relative to other methods which yields the overall advantage of a reduction of perceived patterns (the cause of moires, banding and arbitrarily—imposed abrupt shifts in gray level changes.)

Another advantage to the method of the present invention is that the checkerboard patterns, such as that shown in FIG. 5, makes each cell edge seamless. Therefore, after the analog-to-digital conversion which takes place during the creation of the visual depiction of the precessionary art, it is hard to tell where one cell begins and the next cell ends. As a result, it is possible to obtain a virtual halftone cell.

Still further, the checkerboard pattern and the philosophy of painting with gray embraced by the present method overcomes the need to angle the halftone screen. It has long been a practice in photographic halftoning to angle the black screen at 45 degrees, compromising vertical and horizontal lines equally and better rendering the curves abundant in the natural phenomena being depicted.

Additionally, the method of the present invention yields digital information which can be easier compressed for speedier transmission.

Still further, the accuracy of printer dot placement with the method of the present invention is a large improvement over other patterns. If all 16 areas of the precessionary art analogous to the digital cell were ranked according to gray level and the number of dots needed to emulate the cell's gray level were placed in order from highest to lowest, we would have a very detailed rendering with no grays—this process is called digital posterization, emulating the effect of exposing graphic arts photographic film without using a screen. The method of the present invention relocates pixels from the posterized model an average distance of one pixel to achieve its apparent gray.

The method of the present invention works well with virtually all precessionary art including type, line, drawings and grayscale because of the placement accuracy of plus or minus one pixel.

It is apparent that there has been provided in accordance with this invention a method for reproducing an image which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for reproducing an image which comprises the steps of:

(a) converting a piece of precessionary art to a multi-bit pixel depth bitmap;

(b) defining a first multi-pixel cell having particular dimensional attributes from said bitmap, said cell containing a desired number of pixels and each pixel bearing a value representative of a shade of gray;

(c) determining a gray level for the first multi-pixel cell;

(d) dividing the first multi-pixel cell into two equal groups of alternating pixels with a first one of said groups being nominally on and a second of said groups being nominally off; and (e) deriving a first derivation cell depicting a maximum apparent gray from said first multi-pixel cell having said two equal groups of alternating pixels.

2. The method of claim 1 wherein said converting step comprises:

determining a gray level for each analogous area of the precessionary art equal in size to a single-bit pixel-depth bitmap pixel.

3. The method of claim 1 wherein said defining step comprises defining a square multi-pixel cell having sides of N pixels where N is a number divisible by two.

4. A method for reproducing an image which comprises the steps of:

converting a piece of precessionary art to a multi-bit pixel depth bitmap;

defining a first multi-pixel cell having particular dimensional attributes from said bitmap, said cell containing a desired number of pixels and each pixel bearing a value representative of a shade of gray;

said defining step comprising defining a square multi-pixel cell having sides of N pixels where N is a number divisible by two;

determining a gray level for the first multi-pixel cell;

said gray level determining step comprising comparing actual and total possible gray levels of the first cell and determining which gray level is to be depicted by a first derivation cell;

dividing the first multi-pixel cell into two equal groups of alternating pixels with a first one of said groups being nominally on and a second of said groups being nominally off; and deriving said first derivation cell depicting a maximum apparent gray from said first multi-pixel cell having said two equal groups of alternating pixels.

5. The method of claim 4 wherein said comparing step comprises:

multiplying a desired number of possible grays by the number of pixels in said first cell and obtaining a total number of possible grays;

summing together all values of shades of gray for said pixels forming said cells; and dividing the sum of said gray shade values by said total number of possible grays to obtain a value V to be assigned to said first cell, wherein said value V ranges from 0 to $N^2$.

6. The method of claim 5 wherein said deriving step comprises:

deriving an integer for said first multi-pixel cell using the equation:

$$i = V - (N^2/2).$$

7. The method of claim 6 wherein said deriving step further comprises:

turning on a number of pixels in said second one of said groups equal to said integer if said integer is positive.

8. The method of claim 6 wherein said deriving step further comprises:

turning off a number of pixels in said first one of said groups equal to said integer if said integer is negative.

9. A method for reproducing an image which comprises the steps of:

(a) converting a piece of recessionary art to a multi-bit pixel depth bitmap;

(b) defining a first multi-pixel cell having particular dimensional attributes from said bitmap, said cell containing a desired number of pixels and each pixel bearing a value representative of a shade of gray;

(c) determining a gray level for the first multi-pixel cell;

(d) dividing the first multi-pixel cell into two equal groups of alternating pixels with a first one of said groups being nominally on and a second of said groups being nominally off;

(e) deriving said first derivation cell depicting a maximum apparent gray from said first multi-pixel cell having said two equal groups of alternating pixels;

defining a second multi-pixel cell; and performing steps (c) through (e) to derive a second derivation cell.

10. The method of claim 9 further comprising:

repeating steps (a)–(e) until a series of derivation cells equal in number to the number of multi-pixel cells in said bitmap have been generated; and converting said derivation cells thus generated into a reproduction of said image.

11. The method of claim 10 wherein said converting step comprises converting said image into said multi-bit pixel-depth bitmap through the use of a digital scanner.

* * * * *